United States Patent [19]

Kelsey

[11] Patent Number: 4,842,245
[45] Date of Patent: Jun. 27, 1989

[54] VALVE

[75] Inventor: Christopher G. Kelsey, Sydney, Australia

[73] Assignee: Geoflow International Pty. Limited, Australia

[21] Appl. No.: 82,726

[22] Filed: Aug. 7, 1987

[30] Foreign Application Priority Data

Aug. 15, 1986 [AU] Australia ................ PH7462

[51] Int. Cl.[4] .............................. F16K 13/00
[52] U.S. Cl. ....................... 251/212; 251/205
[58] Field of Search .................. 251/212, 205

[56] References Cited

U.S. PATENT DOCUMENTS

| | | | |
|---|---|---|---|
| 1,170,046 | 2/1916 | Carleton | 251/212 X |
| 1,172,388 | 2/1916 | Prescott | 251/212 X |
| 1,830,214 | 11/1931 | Van Keulen | 251/212 X |
| 2,740,635 | 4/1956 | O'Toole | 251/212 X |

FOREIGN PATENT DOCUMENTS

| | | | |
|---|---|---|---|
| 230085 | 8/1960 | Australia | 251/208 |
| 2056027 | 3/1981 | United Kingdom | 251/212 |

Primary Examiner—A. Michael Chambers
Attorney, Agent, or Firm—Stevens, Davis, Miller & Mosher

[57] ABSTRACT

A fluid control valve has two cylinders arranged parallel to each other with their surfaces in contact. The cylinders are rotated in opposite directions such that their contact surfaces move in the same direction. At least one of the cylinders has a groove formed in its surface extending partially around the circumference and varying in depth along its extent to define an aperture for fluid to flow through. This aperture can be varied in size by rotating the cylinders thereby controlling the flow rate of fluid through the valve. The cylinders are formed with gear teeth on their surfaces which intermesh with each other to provide a seal between the cylinders. The cylinders are rotated by engaged pinion gears driven by suitable drive means.

2 Claims, 2 Drawing Sheets

VALVE

FIELD OF THE INVENTION AND BACKGROUND ART

This invention relates to an improvement in a valve of the type described in Australian patent application No. 60,736/80 (U.K. patent No. 2056027) which has been developed primarily for use in association with flexible pipes or conduits to control the rate of fluid flow therethrough, especially in situations where the fluid flowing through the conduit contains highly abrasive materials.

A valve of the type described includes two cylinders arranged parallel to each other with their circumferential surfaces in contact, at least one of said cylinders having a circumferentially extending groove formed in the surface thereof the depth of which varies along its length, said cylinders at the, or each, groove defining an aperture through which, in use, fluid is constrained to pass, whereby upon rotation of said cylinders relative to each other the size of said aperture varies to vary the rate of flow of fluid through said valve.

In said type of valve, the sealing engagement between the cylinders on either side of the groove, is provided by the rolling contact of plain cylindrical surfaces. An object of the present invention is to provide an alternative mode of sealing.

SUMMARY OF THE INVENTION

In accordance with the present invention, each of the cylinders is provided with gear teeth or like formations and the cylinders are arranged parallel to each other such that said teeth or formations inter-engage.

The profile of the teeth provided on each of the cylinders may be chosen to provide the most efficient seal between the cylinders.

Although it may be possible to eliminate the drive gear to one of the cylinders, compared to the prior art of said Australian patent application mentioned above, it is preferred that both cylinders be driven, and that the driving mechanism be pre-loaded so that the meshing teeth of the two cylinders are always positively engaged, thereby providing an effective seal.

With the provision of gear teeth or similar inter-engaging tooth-like formations on the two cylinders, the serrations provided on the valve chamber lining surface in contact with the valve cylinders, described in the abovementioned U.K. patent specification, may be eliminated, and sealing between the housing and the cylinders in this area may be provided by the contact between the gear teeth on the cylinder periphery, and a smooth cylindrical wall of the housing.

BRIEF DESCRIPTION OF THE DRAWINGS

In order that the invention may be more readily understood it will now be described by way of example with reference to the accompanying drawings in which.

DETAILED DESCRIPTION OF THE PREFERRED EMBODIMENT

Figure 1:
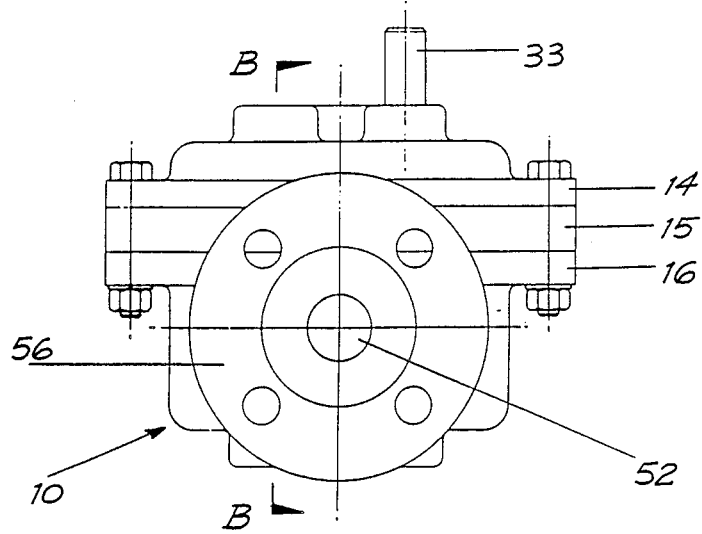
FIG. 1 is an external view of a valve according to the invention.

The valve has a casing 10 made from a suitable metal which may be aluminium. The casing 10 has lower cover 14 and upper cover 16 joined by intermediate plate 15. Within the casing there is a valve chamber having a lining 12 made from a corrosion and abrasion resistant material such as polyurethane. The upper and lower covers 14 and 16 of the casing are provided with recesses 18 having bearings of nylon or other suitable material to receive respective shafts 20 and 22.

Valve cylinders 24, 26 are moulded from a suitable material such as polyurethane or stainless steel depending on their use directly onto the shafts 20, 22 and are prevented from rotation relative to the shafts by respective keys 28, 30 on the shafts. In a situation where corrosive material is likely to be encountered, the shafts 20, 22 are preferably made from stainless steel. The upper ends of the shafts are provided with keys 32, 34 by which respective pinion gears 36, 38 preferably made of nylon are mounted.

The gears 36, 38 are identical so that their teeth inter-mesh to ensure that the shafts 20, 22 will rotate at the same speed as each other and in opposite directions. The gears are driven by means of a shaft 33 extending from the casing 10.

As mentioned above, it is desirable that both cylinders be driven, and that the driving mechanism be pre-loaded so that the meshing teeth of the two cylinders are always positively engaged, thereby providing an effective seal. This may be achieved by slightly off-setting the gears 36, 38 relative to the teeth of the cylinders 24 and 26.

Figure 2:
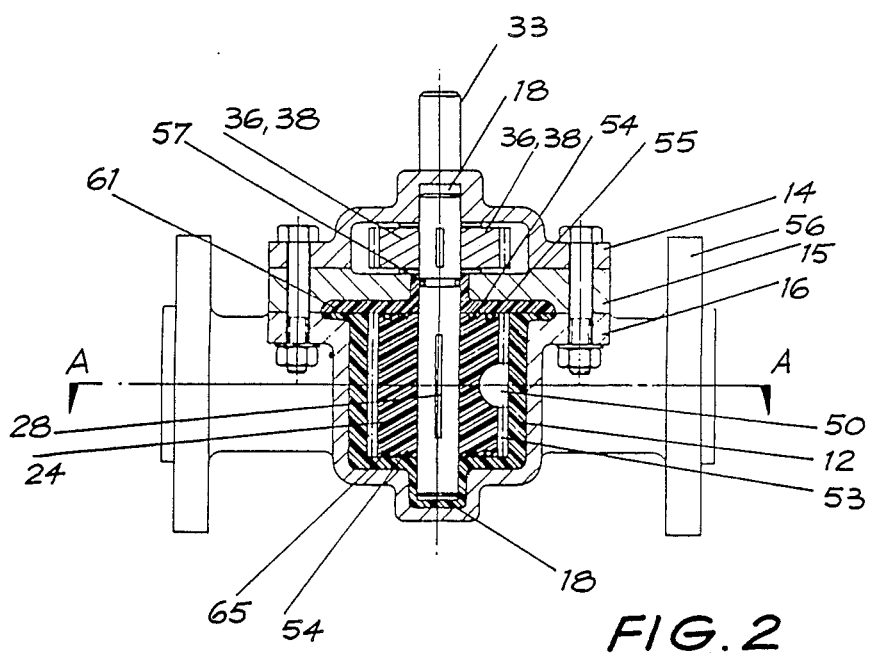
FIG. 2 is a cross-sectional view on line B—B of FIG. 1.
Figure 3:
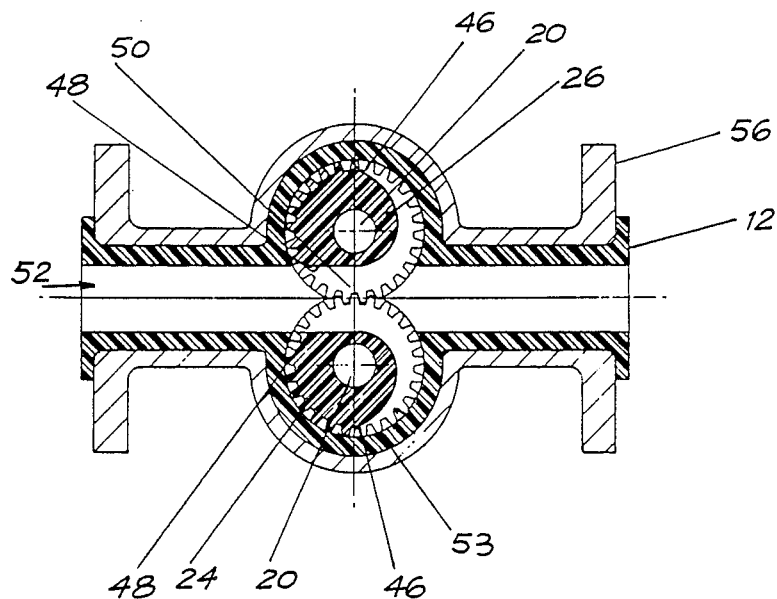
FIG. 3 is a cross-sectional view on line A—A of FIG. 2.

As best shown in FIGS. 2 and 3, each of the valve cylinders 24, 26 has a groove of varying cross-section formed around its periphery. Each groove has a minimum depth at point 46 (see FIG. 3) and a maximum depth at point 48. The cross-section of each groove is preferably semi-circular and the meshing of the gears 36, 38 is so arranged that points 46 of the respective valve cylinders are in contact when the valve is closed.

By operation of the shaft 33 to rotate gears 36, 38 shafts 20, 22 and valve cylinders 24, 26, it is possible to produce an in-line flow aperture 50 of circular cross-section having a diameter from zero to a maximum value equal to the internal diameter of the input-output passages 52.

To seal the valve cylinders 24, 26 in the valve chamber, the surface of valve chamber lining 12 which contacts the valve cylinders 24, 26 has a smooth surface 53 formed in it parallel to the axes of the shafts 20, 22. The relative dimensions of the valve cylinders 24, 26 are selected to provide a slight pressure between the teeth of the cylinders and the surface of the valve chamber lining 12.

The sealing of the valve cylinders 24, 26 in the valve chamber is also assisted by the provision of annular serrations 54 on the upper and lower surfaces of each valve cylinder 24, 26. "O" rings 55 may also be provided for this purpose.

"O" rings 57 provide a seal between the valve chamber with lining 12 and upper chamber defined by cover 16. Lining 61 preferably of polyurethane provides a seal support for "O" rings 57 and bearing support for intermediate plate 15 and shafts 20, 22.

The illustrated valve is provided with coupling flanges 56, although of course other coupling means may be employed.

I claim:

1. A fluid valve including two cylinders arranged parallel to each other with their circumferential surfaces in contact, at least one of said cylinders having a circumferentially extending groove formed in the cylindrical surface thereof the depth of which varies along its length, said cylinders at the, or each, groove defining an aperture through which, in use, fluid is constrained to pass, whereby upon rotation of said cylinders relative to each other the size of said aperture varies to vary the rate of flow of fluid through said valve, said cylinders being located within a valve housing comprising opposed walls at each end of said cylinders and side walls having arcuate portions conforming to said cylindrical surfaces for sealing engagement therewith, said cylindrical surfaces being provided with continuous gear teeth extending between the ends of the cylinders, the gear teeth of respective cylinders sealingly engaging at the region of contact between the cylinders, the gear teeth of each cylinder sealingly engaging said arcuate portions over the region of contact of said cylinders therewith; drive means to rotate said cylinders in unison and in opposite directions; said cylinders having extended support shafts formed integrally therewith or attached thereto; said drive means comprising a pair of identical pinion gears carried by the respective extended support shafts and meshing with each other; the teeth of said pinion gears being off-set relative to said continuous teeth of said cylinders, thereby to maintain positive engagement between the teeth of the respective cylinders.

2. A valve as claimed in claim 1, wherein a groove is provided in the surface of each of said cylinders, said grooves being opposed, to define said aperture.

* * * * *